(12) United States Patent
Sakamaki et al.

(10) Patent No.: US 10,556,502 B2
(45) Date of Patent: Feb. 11, 2020

(54) STRUCTURAL MEMBER AND FUEL TANK

(71) Applicant: SAKAMOTO RESEARCH & DEVELOPMENT HOLDINGS LTD., Ota, Gunma (JP)

(72) Inventors: Tatsuya Sakamaki, Ota (JP); Shunsuke Makino, Ota (JP)

(73) Assignee: SAKAMOTO RESEARCH & DEVELOPMENT HOLDINGS LTD., Ota, Gunma (JP)

( * ) Notice: Subject to any disclaimer, the term of this patent is extended or adjusted under 35 U.S.C. 154(b) by 0 days.

(21) Appl. No.: 16/262,107

(22) Filed: Jan. 30, 2019

(65) Prior Publication Data
US 2019/0232779 A1    Aug. 1, 2019

(30) Foreign Application Priority Data
Jan. 30, 2018   (JP) .................. 2018-013731

(51) Int. Cl.
*B60K 15/03* (2006.01)
*B29C 65/70* (2006.01)
(Continued)

(52) U.S. Cl.
CPC .............. *B60K 15/03* (2013.01); *B29C 65/70* (2013.01); *B29K 2701/12* (2013.01);
(Continued)

(58) Field of Classification Search
CPC .............. B60K 15/03; B60K 15/03177; B60K 2015/03493; B29C 65/70; B29K 2701/12; B29L 2031/00–7172
(Continued)

(56) References Cited

U.S. PATENT DOCUMENTS 2,001,610 A * 5/1935 Hildenbrand .......... B60K 15/03
                                                          210/303
4,852,765 A * 8/1989 Lyzohub .......... B60K 15/03177
                                                          220/560.03
(Continued)

FOREIGN PATENT DOCUMENTS

CN       202557283 U     11/2012
JP       2009132297 A     6/2009
(Continued)

OTHER PUBLICATIONS

Communication dated Oct. 2, 2018, from the Japanese Patent Office in counterpart application No. 2018-013731.

*Primary Examiner* — Kareen K Thomas
(74) *Attorney, Agent, or Firm* — Sughrue Mion, PLLC

(57) ABSTRACT

There is provided a structural member configured to be disposed in an internal space of a fuel tank and support a wall of the fuel tank. The structural member has an axial direction along a direction in which the wall is to be supported, and a radial direction perpendicular to the axial direction. The structural member includes a gas introduction path which is formed to be exposed at a tip end of the structural member and penetrate an inside of the structural member along the axial direction, a first gap which is formed to be concaved in the radial direction to communicate with the gas introduction path through a first hole, and a second hole which is formed to communicate with the gas introduction path at a position more distant from the tip end than the first hole along the axial direction.

6 Claims, 8 Drawing Sheets

(51) Int. Cl.
  *B29L 31/00*    (2006.01)
  *B29K 701/12*   (2006.01)
(52) U.S. Cl.
  CPC . *B29L 2031/7172* (2013.01); *B60K 15/03177* (2013.01); *B60K 2015/03032* (2013.01); *B60K 2015/03493* (2013.01)
(58) Field of Classification Search
  USPC .......................................................... 220/562
  See application file for complete search history.

(56) References Cited

U.S. PATENT DOCUMENTS

| | | |
|---|---|---|
| 6,571,978 B1 * | 6/2003 | Puempel .......... B60K 15/03177 |
| | | 220/562 |
| 2009/0107565 A1 * | 4/2009 | Hanson .................. B60K 15/03 |
| | | 137/544 |
| 2009/0139994 A1 | 6/2009 | Aoki et al. |
| 2011/0041594 A1 * | 2/2011 | Eslami ................ G01L 19/0636 |
| | | 73/114.43 |
| 2011/0140314 A1 | 6/2011 | Grauer |
| 2013/0119578 A1 | 5/2013 | Grauer |
| 2015/0217635 A1 | 8/2015 | Nakane et al. |
| 2016/0046183 A1 | 2/2016 | Hill et al. |
| 2016/0243930 A1 | 8/2016 | Criel |

FOREIGN PATENT DOCUMENTS

| | | |
|---|---|---|
| JP | 2009234406 A | 10/2009 |
| JP | 2015030117 A | 2/2015 |
| JP | 5871280 B2 | 3/2016 |
| JP | 2017501066 A | 1/2017 |

\* cited by examiner

STRUCTURAL MEMBER AND FUEL TANK

CROSS-REFERENCE TO RELATED APPLICATION

This application claims priority from Japanese Patent Application No. 2018-013731, filed on Jan. 30, 2018, the entire subject matter of which is incorporated herein by reference.

TECHNICAL FIELD

The present disclosure relates to a structural member and a fuel tank.

BACKGROUND ART

A variety of members are mounted on inner and outer sides of a container such as a fuel tank. A variety of technologies have been suggested as a method of mounting those members. A metallic fuel tank has been conventionally used. A resin fuel tank molded by resin such as thermoplastic resin is recently used from standpoints of weight reduction and the like. Considering this situation, a new technology has been suggested as a method of mounting a component to the fuel tank and the like.

Japanese Patent No. 5,871,280B discloses a method and a system for connecting a constitutional component to a molded product. The method disclosed in Japanese Patent No. 5,871,280B includes (a) a process of providing a constitutional component having a void in the vicinity of a wall of a molded product to be blow-molded and providing the void of the constitutional component in a recess part provided in a mold surface of a mold, (b) a process of overlapping a part of the constitutional component and a part of the wall of the molded product while the wall of the molded product is still at least partially melted, and (c) a process of cooling the wall of the molded product together with the part of the constitutional component overlapping the part of the wall of the molded product so as to maintain connection between the constitutional component and the wall of the molded product. In the process (b), at least one tool is moved in association with the constitutional component, so that the tool moves a part of the wall of the molded product with being engaged with the part of the wall of the molded product and the part of the wall of the molded product is thus at least partially moved to the void until the part of the wall of the molded product overlaps the part of the constitutional component.

Japanese Patent No. 5,871,280B discloses the method of mounting the constitutional component to the wall of the molded product to be blow-molded. In this method, during the blow molding, the parison and the constitutional component are contacted with the wall of the mold, for example, the recess part of the wall, the mold is closed and the air is then blown (blow up). At this time, a part of the parison is moved to the void of the constitutional component, so that a part of the wall of the parison is sandwiched between the two parts of the constitutional component, and the parison and the constitutional component are thus joined.

According to the method disclosed in Japanese Patent No. 5,871,280B, since the mold is closed in a state where a gap is formed between the constitutional component and the parison, the gas staying in the gap cannot escape. As a result, the movement of the parison to the void of the constitutional component is obstructed by a pressure of the staying gas, so that the joining strength of the constitutional component and the parison may be lowered.

SUMMARY

Accordingly, an aspect of the present disclosure provides a structural member that can be mounted to a wall of a fuel tank with high reliability.

According to an embodiment of the present disclosure, there is provided a structural member configured to be disposed in an internal space of a fuel tank and support a wall of the fuel tank, wherein the structural member has an axial direction along a direction in which the wall is to be supported, and a radial direction perpendicular to the axial direction. The structural member includes: a gas introduction path which is formed to be exposed at a tip end of the structural member and penetrate an inside of the structural member along the axial direction; a first gap which is formed to be concaved in the radial direction to communicate with the gas introduction path through a first hole; and a second hole which is formed to communicate with the gas introduction path at a position more distant from the tip end than the first hole along the axial direction.

In the above structural member, the first gap may be provided with at least two pillar-shaped members for securing the first gap, and the first hole may be provided at a position at which the two pillar-shaped members intersect with each other.

In the above structural member, the two pillar-shaped members may be provided to perpendicularly intersect with each other on a plane along the radial direction.

The above structural member further includes a second gap which is concaved in the radial direction to communicate with the gas introduction path through the second hole.

In the above structural member, the first hole may be a gas inflow hole through which a gas is to be introduced into the gas introduction path, and the second hole may be a gas outflow hole through which a gas is to flow out from the gas introduction path.

According to another embodiment of the present disclosure, there is provided a fuel tank including the above structural member.

In the above fuel tank, the first gap may be provided between a planar top part positioned at the tip end of the structural member and a seating part, the seating part may be provided on a flange part protruding in the radial direction, and the wall may be located in the first gap and is provided on a step part defined by the seating part and the flange part.

The structural member of the present disclosure includes the gas introduction path and two holes through which the gas can be escaped. Therefore, the gas can escape, which tends to stay between the structural member and the material of the wall of the tank during the molding, so that it is possible to appropriately join the structural member and the tank.

BRIEF DESCRIPTION OF THE DRAWING

FIGS. 2A to 2C schematically illustrate processes of a related-art method of mounting a structural member, in which FIG. 2A illustrates a first process, FIG. 2B illustrates a second process, and FIG. 2C illustrates a third process.

FIGS. 4A and 4B illustrate an engaged state of the structural member of the embodiment and a parison, in which FIG. 4A is a top view and FIG. 4B is a sectional view taken along a line A-A of FIG. 4A.

FIGS. 5A and 5B illustrate the engaged state of the structural member of the embodiment and the parison, in which FIG. 5A is a side view and FIG. 5B is a sectional view taken along a line B-B of FIG. 5A.

FIGS. 6A to 6C illustrate a part of the structural member of the embodiment, in which FIG. 6A is a top view, FIG. 6B is a sectional view taken along a line C-C of FIG. 6A and FIG. 6C is a sectional view taken along a line D-D of FIG. 6A.

FIGS. 7A and 7B illustrate a part of the structural member of the embodiment, in which FIG. 7A is a side view and FIG. 7B is a sectional view taken along a line E-E of FIG. 7A.

FIGS. 8A to 8C illustrate processes of mounting the structural member and the parison according to the embodiment, in which FIG. 8A illustrates a first process, FIG. 8B illustrates a second process, and FIG. 8C illustrates a third process.

DETAILED DESCRIPTION OF EMBODIMENTS

Hereinafter, the details and other features of the present disclosure will be described with reference to an embodiment.

Figure 1:
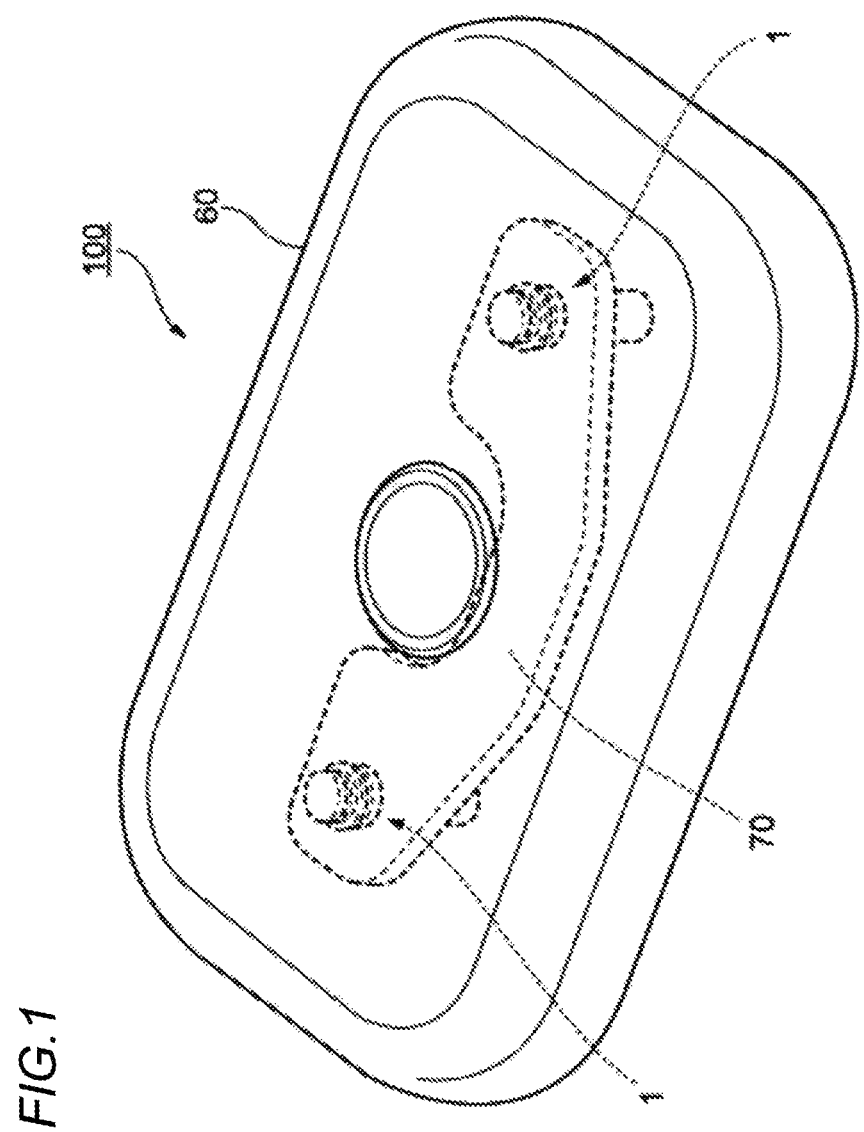
FIG. 1 is a perspective view illustrating an example of a resin fuel tank using a structural member according to an embodiment of the present disclosure.

FIG. 1 is a perspective view illustrating an example of a resin fuel tank using a structural member according to an embodiment of the present disclosure. A resin fuel tank 100 is to be mounted to an automobile, for example. A main body 60 of the fuel tank 100 is molded by resin such as thermoplastic resin, from standpoints of weight reduction and the like. A flat plate-shaped internal member 70 and a structural member 1 are disposed in an internal space of the main body 60. The structural member 1 connects an inner wall of the main body 60 and the internal member 70, so that the internal member 70 is stably fixed in the main body 60 and a shape of the resin fuel tank 100 is maintained.

Figure 2A:
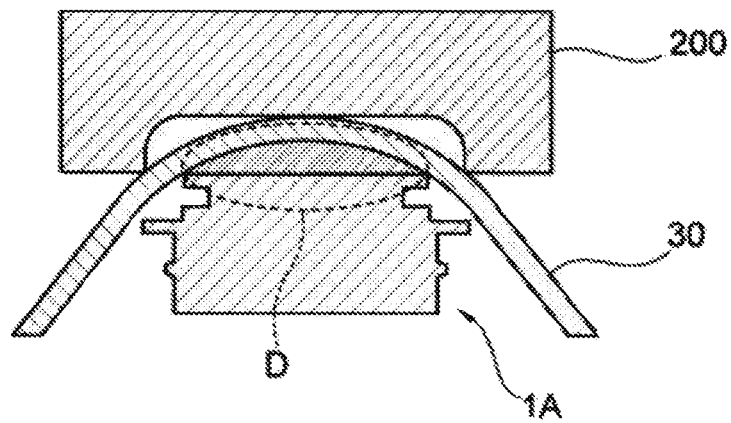
Figure 2B:
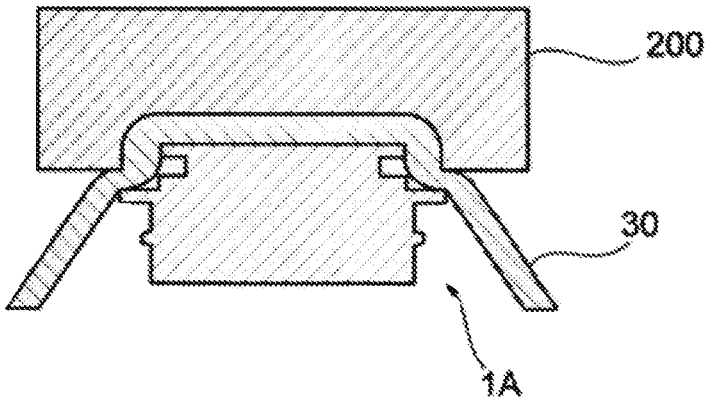
Figure 2C:
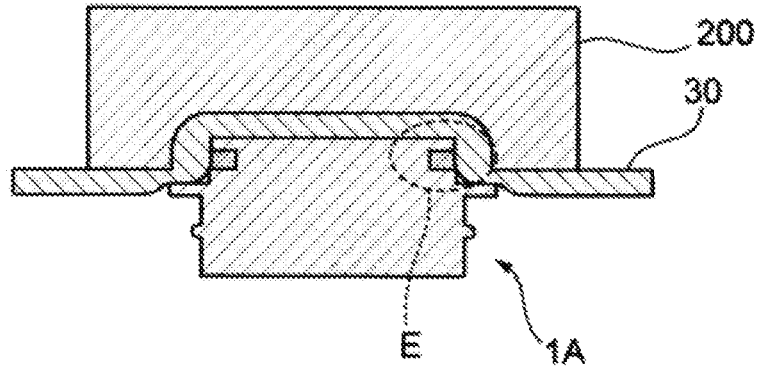

FIGS. 2A to 2C schematically illustrate a problem that may occur in a process of the related-art mounting method as disclosed in Japanese Patent No. 5,871,280B. In a first process of FIG. 2A, a related-art structural member 1A is positioned in the vicinity of a parison 30 for forming a wall of the main body 60, and a part of the parison 30 is in contact with a wall of a mold 200. In this state, a gas (air) may be stagnant in a D region between the structural member 1A and the parison 30.

In a second process of FIG. 2B, the structural member 1A is pushed into the wall of the mold 200 via the parison 30 from the first process, and a part of the parison 30 is closely contacted to the wall of the mold 200. In a third process of FIG. 2C following the second process, the mold is closed, so that the structural member 1A and the parison 30 are closely contacted to the wall of the mold 200. Accordingly, the gas staying in the process of FIG. 2A cannot escape, so that the gas moves to a void and the like formed in a surface of the structural member 1A and the gas stays in an E region corresponding to the void, for example.

As a result, the movement of the parison 30 to the void of the structural member 1A is obstructed by a pressure of the staying gas, so that a so-called anchoring effect of the structural member 1A and the parison 30 is suppressed and the joining strength of the structural member and the parison may be lowered.

Figure 3:
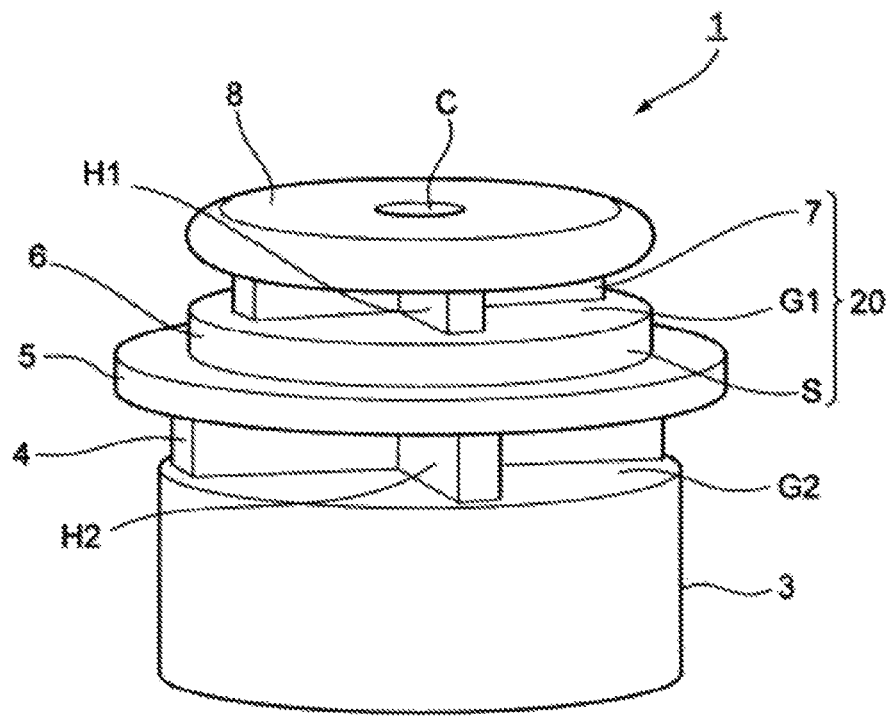
FIG. 3 is a perspective view illustrating the entire structural member of the embodiment.

FIG. 3 is a perspective view illustrating the entire structural member 1 of the embodiment of the present disclosure, which may solve the above problems. The structural member 1 has a substantially cylindrical shape as a whole and is a kind of an internal structural member configured to connect the main body 60 and the internal member 70 and configured to serve as a pillar member for supporting a wall of the main body 60 and securing a predetermined space in the main body 60. The structural member 1 has an axial direction (Z direction) along a direction in which the wall of the main body 60 is to be supported, and a radial direction (X direction) perpendicular to the axial direction.

The structural member 1 has a base part 3, a second gap formation member 4 provided on the base part 3, a flange part 5 provided on the second gap formation member 4, a seating part 6 provided on the flange part 5, a first gap formation member 7 provided on the seating part 6, and a planar top part 8 provided on the first gap formation member 7 at a tip end (top part) of the structural member 1. The base part 3, the second gap formation member 4, the flange part 5, the seating part 6, the first gap formation member 7 and the planar top part 8 are coaxially arranged about a center part of the structural member 1 in the axial direction. A gas introduction path C is formed at a center in a plane in the radial direction and extending along the axial direction of the structural member 1 so as to be exposed at the planar top part 8 of the tip end and penetrate the center of the structural member 1.

The base part 3 is to be fixed to the internal member 70 of a lower side (not shown). The fixing manner is not particularly limited, and the member to which the base part 3 is to be fixed is not also particularly limited. The second gap formation member 4 provided on an upper surface of the base part 3 has a cross shape in a plan view which is perpendicular to the axial direction of the structural member 1. The second gap formation member 4 secures a second gap G2 between the base part 3 and the flange part 5. The second gap G2 is formed to be concaved in the radial direction of the structural member 1, so that a predetermined space is secured.

The flange part 5 provided on the second gap formation member 4 is a disc-shaped member protruding most outward in the radial direction of the structural member 1. The seating part 6 provided on an upper surface of the flange part 5 is formed on an upper plane of the flange part 5 and defines a step part S with the flange part 5. The first gap formation member 7 arranged on an upper surface of the seating part 6 has a cross shape in a plan view which is perpendicular to the axial direction of the structural member 1, similarly to the second gap formation member 4 (refer to FIGS. 5B and 7B). The first gap formation member 7 secures a first gap G1 between the seating part 6 and the planar top part 8. The planar top part 8 is a disc-shaped member positioned on the first gap formation member 7 and at a top part of the structural member 1 and having a planar surface, and the gas introduction path C opens at a center thereof.

Figure 4A:
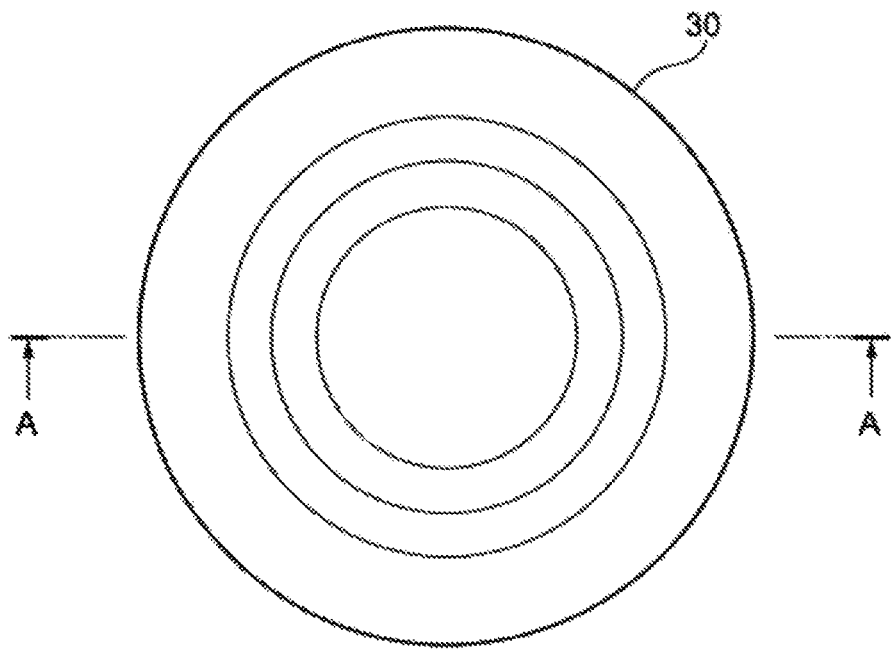
Figure 4B:
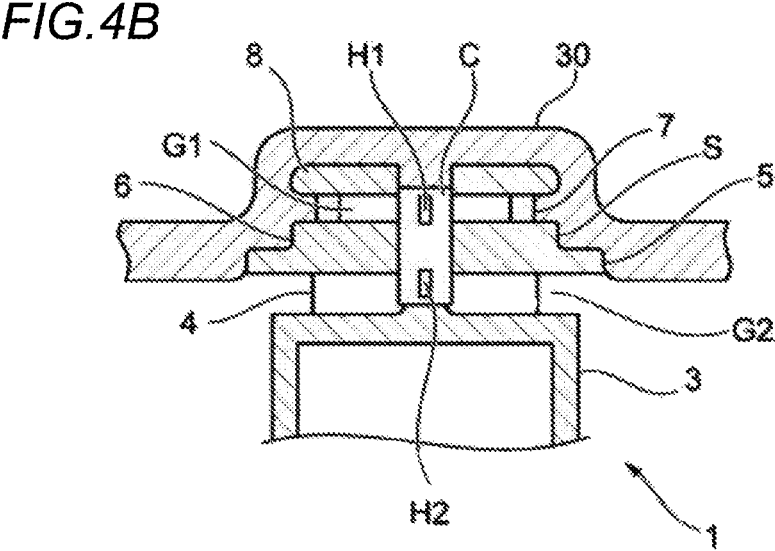

FIGS. 4A and 4B illustrate an engaged state of the structural member 1 of the embodiment and a parison 30 which will be a material of the wall of the main body 60 during the molding, in which FIG. 4A is a top view and FIG. 4B is a sectional view taken along a line A-A of FIG. 4A. Similarly, FIGS. 5A and 5B illustrate the engaged state of the structural member 1 of the embodiment and the parison 30, in which FIG. 5A is a side view and FIG. 5B is a sectional view taken along a line B-B of FIG. 5A.

A surface of an upper part (a part higher than the flange part 5) of the structural member 1 has an unevenness shape by the planar top part 8, the seating part 6, the flange part 5 and the first gap G1 and step part S located therebetween, and the unevenness-shaped part forms an anchor part 20 that is to be joined to the parison 30. The anchor part 20 exhibits an anchoring effect to the parison 30, so that the anchor part and the parison are firmly joined.

Figure 5A:
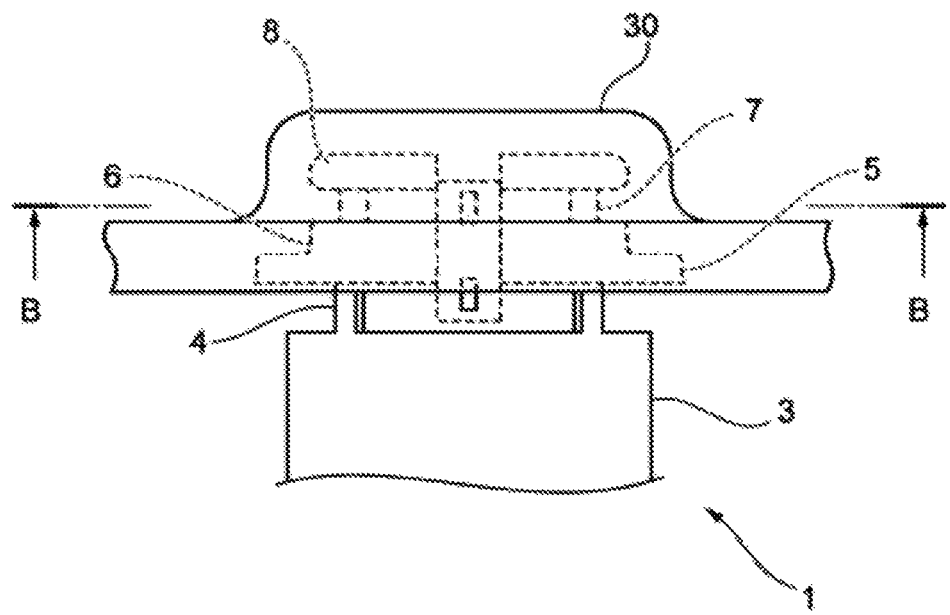
Figure 5B:
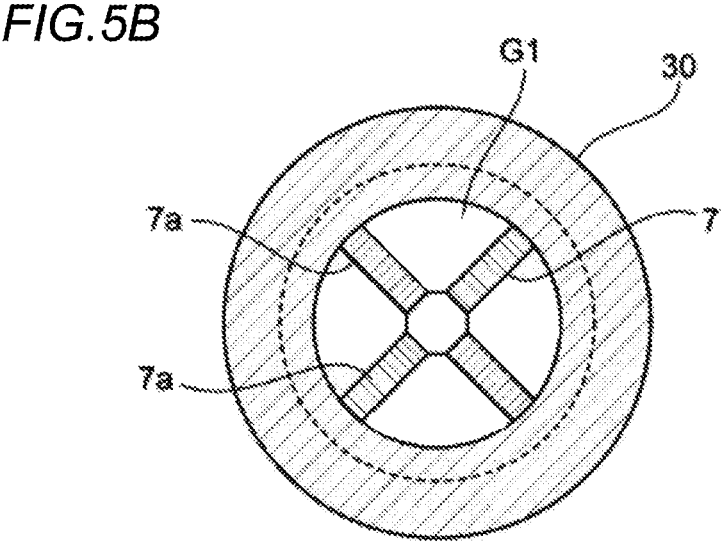

In particular, as shown in FIGS. 4B and 5A, in the embodiment, the parison 30 is located in the first gap G1 of the structural member 1, so that the strength of the joined part of the anchor part 20 and the parison 30 is improved and the joining is thus stabilized. That is, the first gap G1 is formed to be concaved to secure a predetermined space in the radial direction of the structural member 1, and the so-called anchoring effect is exhibited between the parison 30 located in the first gap G1 and the structural member 1. Accordingly, the parison 30 and the structural member 1 are firmly joined. Also, the parison 30 is provided at the step part S formed continuously to the first gap G1, so that the joining strength is also improved by the step part S.

Figure 6A:
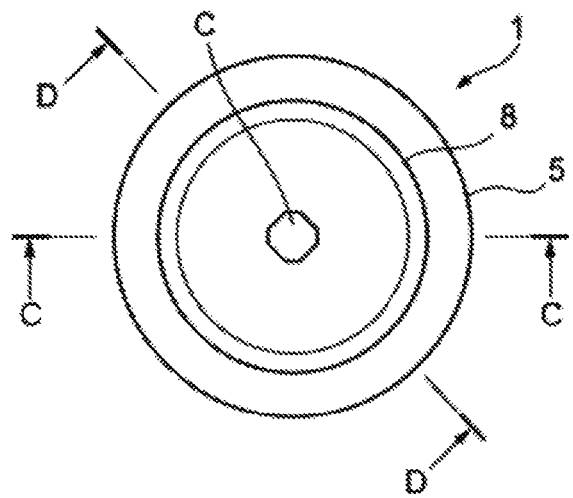
Figure 6B:
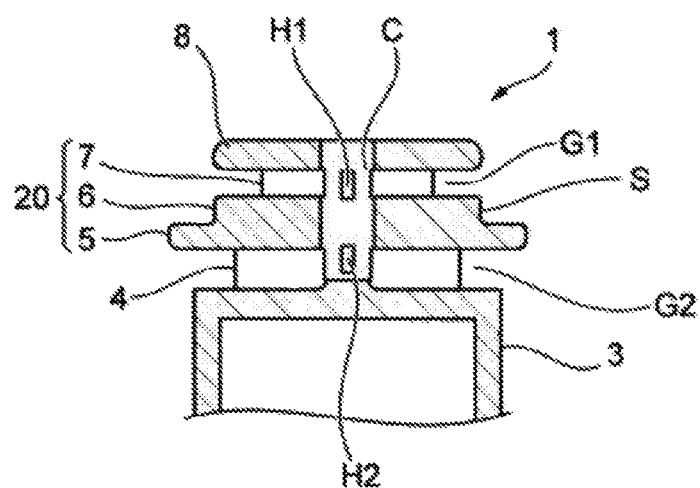
Figure 6C:
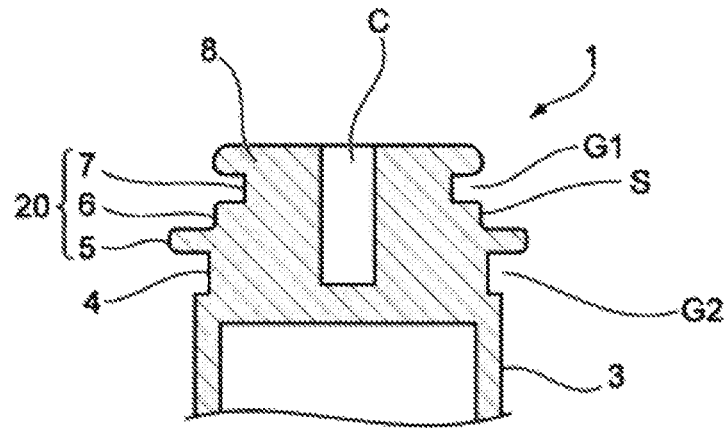

FIG. 6A to 6C illustrate a part of the structural member 1 of the embodiment, in which FIG. 6A is a top view, FIG. 6B is a sectional view taken along a line C-C of FIG. 6A and FIG. 6C is a sectional view taken along a line D-D of FIG. 6A.

As shown in FIGS. 6A to 6C, the center part of the structural member 1 in the axial direction is formed with the gas introduction path C so as to penetrate a center of the structural member 1 from the planar top part 8 to the base part 3. As described later, the gas (air) stagnant at the upper part of the structural member 1 in the first process shown in FIG. 2A can be introduced from the gas introduction path C and first gap G1 of the structural member 1 and move downward. The gas introduction path C is configured to communicate with the first gap G1 and the second gap G2, and the gas introduced from the gas introduction path C joins the gas introduced from the first gap G1, and the joined gas flows out from the second gap G2.

Figure 7A:
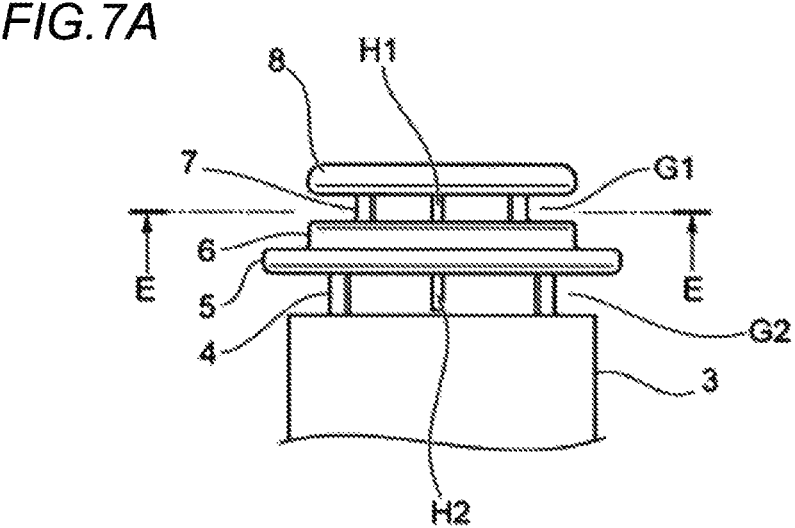
Figure 7B:
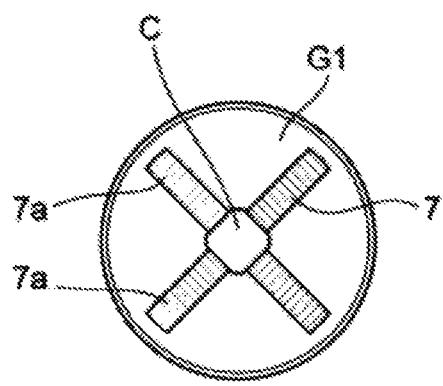

FIGS. 7A and 7B illustrate a part of the structural member 1 of the embodiment, in which FIG. 7A is a side view and FIG. 7B is a sectional view taken along a line E-E of FIG. 7A. As shown in FIG. 7B, the first gap formation member 7 provided on the upper surface of the seating part 6 has a cross shape in a plan view which is perpendicular to the axial direction of the structural member 1, similar to the second gap formation member 4. It can be said that the first gap formation member 7 and the second gap formation member 4 are configured by four-divided pillar-shaped members (ribs) 7a. The at least two pillar-shaped members 7a are arranged to perpendicularly intersect with each other on a plane along the radial direction, so that it is possible to secure a gap. Also, it is possible to secure the gap and predetermined strength by the four pillar-shaped members 7a arranged in a cross shape.

As shown in FIGS. 3, 4B, 6B and 7B, a first hole H1 is provided at a position at which the two (or four) pillar-shaped members 7a intersect with each other. The first gap G1 communicates with the gas introduction path C through the first hole H1. Similarly, a second hole H2 is provided at a position at which the two (or four) pillar-shaped members intersect with each other. The second hole H2 is provided at the position more distant from the tip end of the structural member 1 than the first hole H1 in the axial direction, and the second gap G2 communicates with the gas introduction path C through the second hole H2.

In the embodiment, as shown in FIG. 4B, the parison 30 for molding the main body 60 of the resin fuel tank 100 is formed to have a bag shape and surrounds the anchor part 20 including the flange part 5, the seating part 6, the second gap formation member 4 and the planar top part 8. As a result, the parison 30 can be easily located in the anchor part 20, particularly the first gap G1 of the structural member 1, so that the anchoring effect is efficiently exhibited and the structural member 1 is thus stably fixed at a predetermined position.

Figure 8A:
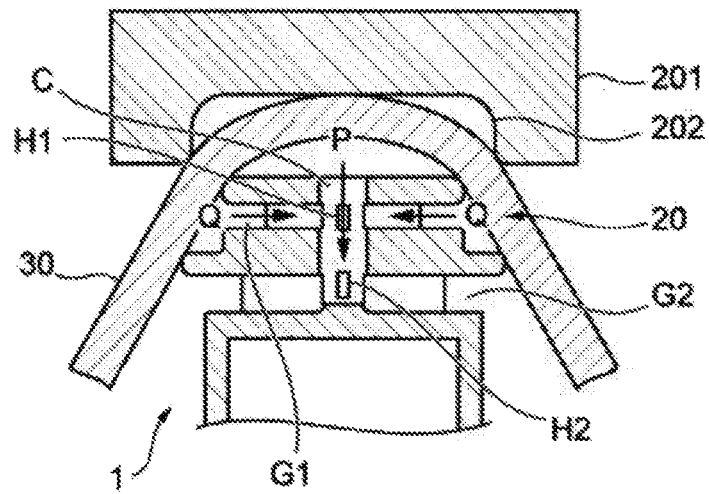
Figure 8B:
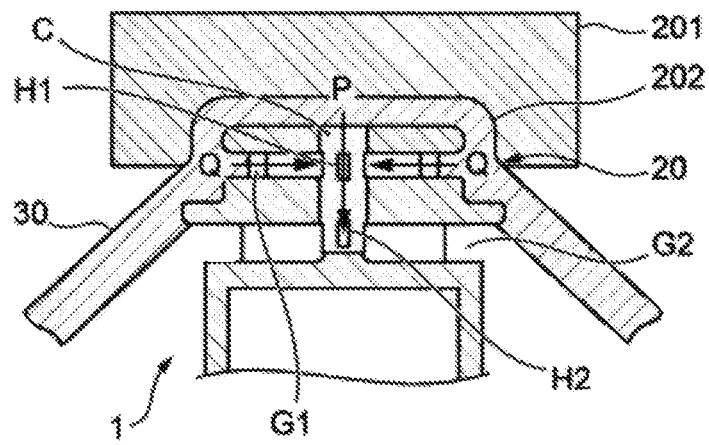
Figure 8C:
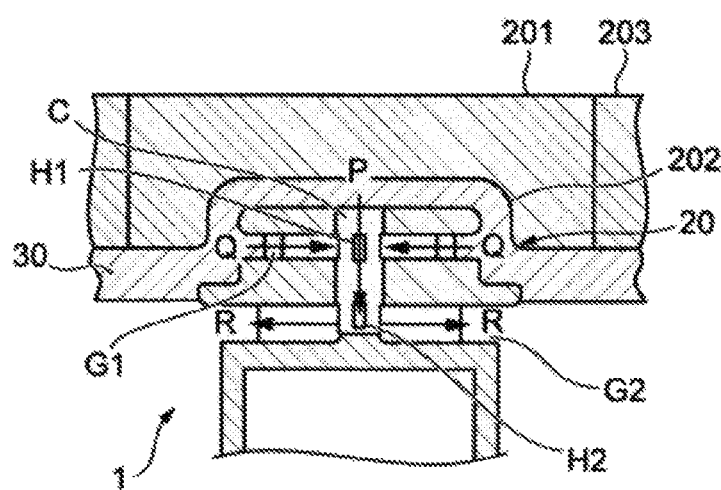

FIG. 8A to 8C illustrate a process of mounting (joining) the structural member 1 of the embodiment and the parison 30, in which FIG. 8A illustrates a first process, FIG. 8B illustrates a second process and FIG. 8C illustrates a third process. The parison 30 having a predetermined size is formed in advance by blow molding. Then, as shown in FIG. 8A, the parison 30 is disposed in a recess part 202 of a first mold 201 and the structural member 1 is disposed at a position adjacent to the parison 30. Thereafter, as shown in the second process of FIG. 8B, when the first mold 201 is moved (downward) from the first process of FIG. 8A, the planar surface of the planar top part 8 of the structural member 1 presses the parison 30 and the parison 30 enters the recess part 202.

As described above, the surface of the structural member 1 is formed in advance with the anchor part 20 having an unevenness shape. For this reason, when the first mold 201 starts to move, the parison 30 is further closely contacted to the anchor part 20, so that the parison 30 and the structural member 1 are joined each other.

At this time, as described in FIGS. 2A to 2C, the gas (air) stays between the anchor part 20 and the parison 30 before the joining, so that the gas may obstruct the joining of the anchor part 20 and the parison 30. However, as described above, the structural member 1 of the embodiment is formed with the gas introduction path C, the first hole H1 and the second hole H2 through which the gas is enabled to pass. For this reason, in the processes from FIG. 8A to FIG. 8B, the gas (air) staying between the parison 30 and the anchor part 20 can move. In the embodiment, as shown with an arrow P, the gas is introduced from the gas introduction path C, and as shown with an arrow Q, the gas is introduced from the first gap G1 through the first hole H1 and joins the gas in the gas introduction path C.

In the third process of FIG. 8C, in a state where the first mold 201 holds the parison 30 and the structural member 1, a second mold 203 around the first mold 201 is moved (downward) to mold-clamp the first mold 201 and the second mold 203, the air is blown into the first mold 201 and the second mold 203 (blow up) and the parison 30 is closely contacted to an inner wall of the first mold 201 including the recess part 202 and an inner wall of the second mold 203. Then, the gases introduced from the gas introduction path C and the first gap G1 move downward, and flow out from the second gap G2 through the second hole H2, as shown with an arrow R.

Therefore, according to the structural member 1 of the embodiment, it is possible to positively allow the gas (air) staying between the parison 30 and the anchor part 20 of the structural member 1 to escape by using the gas introduction path C and the first gap G in which the parison 30 is located. Therefore, it is possible to suppress the staying gas from obstructing the movement of the parison 30 to the first gap G1, so that it is possible to secure the necessary joining strength of the parison 30 and (the anchor part 20 of) the structural member 1 and to improve the joining strength.

In the embodiment, the first hole H1 functions as a gas inflow hole through which the gas is to be introduced into the gas introduction path C, and the second hole H2 functions as a gas outflow hole through which the gas is to flow out from the gas introduction path C. The second hole H2 and the second gap G2 are located at a side more distant from the tip end of the structural member 1 than the first hole H1 and the first gap G1, i.e., at a downstream side to which the gas is to flow, so that it is possible to smoothly discharge the gas.

In the meantime, the materials for forming the main body 60 and the structural member 1 are not particularly limited. The main body 60 may be molded by thermoplastic resin such as denatured polyethylene, high-density polyethylene and the like. However, the material is not particularly limited. The structural member 1 may be molded by synthetic resin such as polyethylene, polypropylene, polyacetal, polyamide and the like. However, the material is not particularly limited. The main body 60 and the structural member 1 may be molded by the same material.

In the meantime, the present disclosure is not limited to the embodiment and can be appropriately modified and improved. In addition, the materials, shapes, sizes, numerical values, forms, number, arrangement places and the like of the respective constitutional elements of the embodiment are arbitrary and are not particularly limited inasmuch as the present invention can be implemented.

The invention claimed is:

1. A structural member configured to be disposed in an internal space of a fuel tank and support a wall of the fuel tank, wherein the structural member has an axial direction along a direction in which the wall is to be supported, and a radial direction perpendicular to the axial direction, the structural member comprising:
   a gas introduction path which is formed to be exposed at a tip end of the structural member and penetrate an inside of the structural member along the axial direction;
   a first gap which is concaved in the radial direction to communicate with the gas introduction path through a first hole;
   a second hole which is formed to communicate with the gas introduction path at a position more distant from the tip end than the first hole along the axial direction; and
   a second gap which is concaved in the radial direction to communicate with the gas introduction path through the second hole.

2. The structural member according to claim 1,
   wherein the first gap is provided with at least two pillar-shaped members for securing the first gap, and
   wherein the first hole is provided at a position at which the two pillar-shaped members intersect with each other.

3. The structural member according to claim 2,
   wherein the two pillar-shaped members are provided to perpendicularly intersect with each other on a plane along the radial direction.

4. The structural member according to claim 1,
   wherein the first hole is a gas inflow hole through which a gas is to be introduced into the gas introduction path, and
   wherein the second hole is a gas outflow hole through which a gas is to flow out from the gas introduction path.

5. A fuel tank comprising the structural member according to claim 1.

6. A fuel tank comprising
   a structural member configured to support a wall of the fuel tank,
   wherein the structural member has an axial direction along a direction in which the wall is to be supported, and a radial direction perpendicular to the axial direction,
   wherein the structural member comprises:
   a gas introduction path which is formed to be exposed at a tip end of the structural member and penetrate an inside of the structural member along the axial direction;
   a first gap which is concaved in the radial direction to communicate with the gas introduction path through a first hole; and
   a second hole which is formed to communicate with the gas introduction path at a position more distant from the tip end than the first hole along the axial direction,
   wherein the first gap is provided between a planar top part positioned at the tip end of the structural member and a seating part,
   wherein the seating part is provided on a flange part protruding in the radial direction, and
   wherein the wall is located in the first gap and is provided on a step part defined by the seating part and the flange part.

* * * * *